Aug. 27, 1957     L. E. BILLINGSLEY     2,804,314
FIFTH WHEEL CONTROL FOR SEMI-TRAILERS
Filed Feb. 11, 1955     2 Sheets-Sheet 1
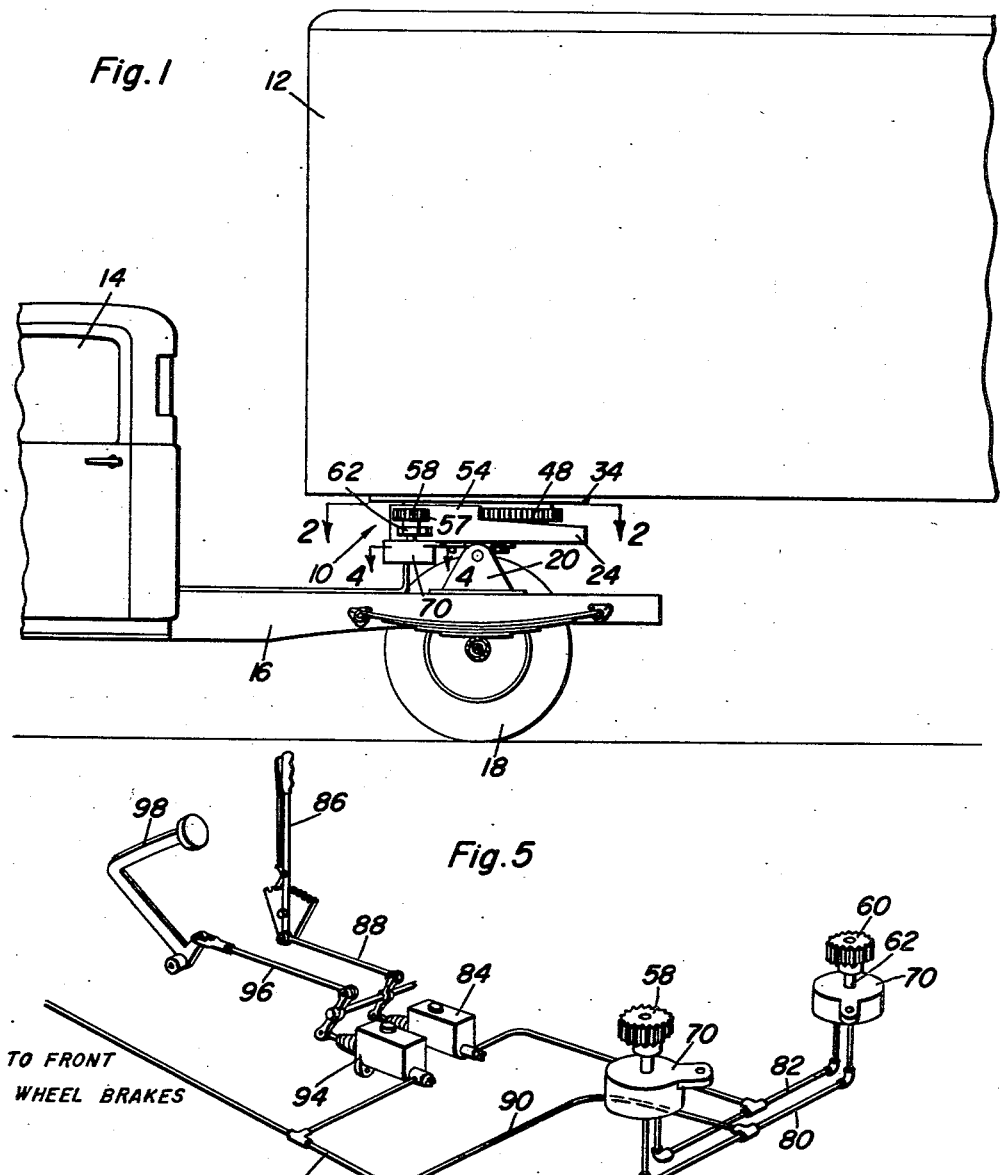
Lewell E. Billingsley
INVENTOR.

Aug. 27, 1957     L. E. BILLINGSLEY     2,804,314
FIFTH WHEEL CONTROL FOR SEMI-TRAILERS
Filed Feb. 11, 1955     2 Sheets-Sheet 2
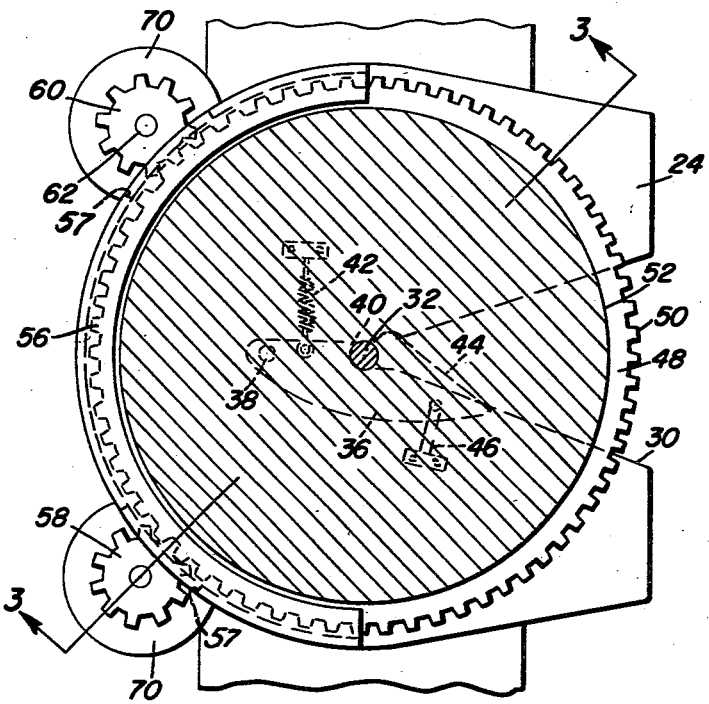
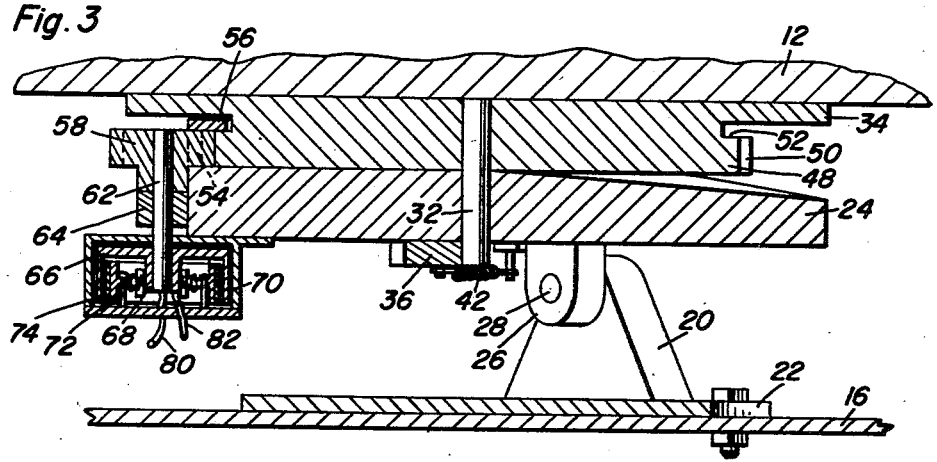
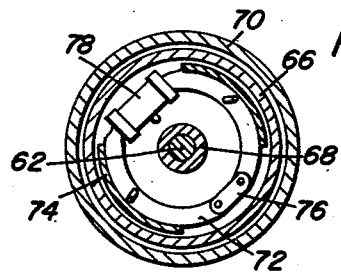
Lewell E. Billingsley
INVENTOR.

United States Patent Office 2,804,314
Patented Aug. 27, 1957

2,804,314

FIFTH WHEEL CONTROL FOR SEMI-TRAILERS

Lewell E. Billingsley, Galena Park, Tex., assignor of twelve and one-half percent to William L. Moy and twelve and one-half percent to Muriel Moy, Dearborn, Mich.

Application February 11, 1955, Serial No. 487,574

3 Claims. (Cl. 280—432)

This invention generally relates to a fifth wheel control for semi-trailers, and more specifically provides an improved antijackknife apparatus adapted to be mounted on the fifth wheel interconnecting the tractor and semi-trailer to prevent jackknifing of such semi-trailers and at the same time to eliminate "humping" of such semi-trailers.

Jackknifing is a term generally applied to the swinging of a trailer or semi-trailer out of its path of travel and out of the path of travel of the tractor to which it is connected, and is generally caused by the skidding of the ground wheels on either the tractor or the semi-trailer or on both portions of the vehicle which results in the two vehicles closing upon one another similar to the blades of a jackknife. Although some relative swinging movement between the trailer and the tractor during movement may be expected and is not particularly hazardous as long as the speed of the tractor is equal to or greater than the speed of the trailer, deceleration of the tractor or application of the brakes of the tractor and the trailer may cause the trailer to swing to an excessive angle relative to the tractor. This is especially true in the event that the brakes of the tractor respond more quickly or hold more firmly than the brakes of the trailer for any of various reasons. Several attempts have been made previously to provide means for overcoming the jackknifing tendency of the trailer relative to the tractor under the conditions heretofore stated. However, none of these has been effective in operation regardless of the angularity of the trailer relative to the tractor, and it was necessary that the trailer move through a predetermined arc before the previous antijackknife devices would become effective. By the time such devices would become effective, the trailer would have built up such momentum in its arcuate movement as to either overcome the effect of the antijackknife device or to cause the tractor to also be swung around with the trailer, which would generally cause both the tractor and trailer to be damaged by turning over or striking some object.

Therefore, it is the primary object of the present invention to provide an antijackknife apparatus for a tractor-trailer vehicle combination in the form of a fifth wheel control which is actuated in cooperating relationship to the braking system of the tractor and the trailer wherein the tractor and the trailer are provided with meshing gears to which a brake is applied to prevent rotation therebetween when the brakes of the tractor and trailer are applied, whereby the antijackknife device will be actuated as soon as the brakes of the tractor-trailer vehicle combination are applied.

Another object of the present invention is to provide a fifth wheel control in the form of an antijackknife device as previously set forth whereby the device may be actuated by a manual control when the brakes of a tractor and trailer are not applied, whereby relative pivotal movement between the tractor and trailer may be substantially controlled during all phases of operation of the vehicle combination, such as when backing, parking or the like.

Still another object of the present invention is to provide a fifth wheel control in conformance with the preceding objects which also includes an upstanding peripheral flange on the tractor portion of the fifth wheel which engages the forward edge and is positioned over the upper surface of a portion of the fifth wheel that is rigidly secured to the trailer whereby forward longitudinal movement of the trailer in relation to the tractor is prevented, and also vertical movement of the trailer in relation to the tractor is prevented, thereby preventing "humping" such as normally occurs in the uncoupling of trailers in what is commonly referred to as a humping action.

Other important objects of the present invention will reside in its simplicity of construction, ease of attachment to existing fifth wheel constructions, efficiency in operation, safety, its adaptation for its particular purposes, and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing a tractor and semi-trailer with the fifth wheel control of the present invention installed thereon;

Figure 2 is a plan sectional view taken substantially upon a plane passing along section line 2—2 of Figure 1 showing the construction of the rigid gear secured to the trailer and the rotatable gears in meshing engagement therewith together with the encasing flange on the front of the portion of the fifth wheel secured to the tractor;

Figure 3 is a transverse, vertical sectional view taken substantially upon a plane passing along section line 3—3 of Figure 2 showing the details of construction thereof;

Figure 4 is a plan sectional view taken substantially upon a plane passing along section line 4—4 of Figure 1 showing the details of construction of the internal brake shoes that expand outwardly for retarding the rotation of the rotatable gear for controlling the pivotal movement between the tractor and trailer; and Figure 5 is a schematic view of the brake control means for the brakes on the rotatable gears wherein the fifth wheel control may be actuated by the brake systems by the vehicle combination or by a manual brake.

Referring now specifically to the drawings, it will be seen that the numeral 10 generally designates the fifth wheel control of the present invention for interconnecting a trailer 12 and a tractor 14 having a frame 16 and rear ground engaging and supporting wheels 18 at the rear end thereof. Generally, the tractor 14 and the trailer 12 form no parts of the present invention and may be of any conventional construction. Secured to the upper surface of the frame 16 is a pair of A-shaped lugs 20 mounted on a base plate 22. These lugs 20 support the fifth wheel 24 having depending lugs 26 with pins 28 extending therethrough, thereby pivotally securing the fifth wheel 24 to the frame 16 for pivotal movement about a transverse horizontal axis. The fifth wheel 24 is provided with the usual guide slot 30 in the rear edge thereof for receiving the coupling pin 32 attached to the coupling plate 34 on the under-surface of the trailer 12. A latch generally designated by the numeral 36 is pivotally secured by a pivot pin 38 to the undersurface of the fifth wheel 24 and the latch 36 includes a notch 40 for receiving the coupling pin 32 and the latch 36 is retained in closed position or latched position by tension coil spring 42. The outer edge of the latch 36 is provided with a cam surface 44 wherein rearward movement of the fifth wheel 24 in relation to the coupling plate 34 on the trailer 12 will cause the coupling pin 32 to move inwardly in the guide slot that has inwardly converging side walls as designated by the numeral 30 for engaging the cam edge 44 of the latch 36, thereby forcing the latch outwardly about pivot pin 38 against the action of spring 42 until the coupling pin 32 is received in the notch 40 in the latch 36 and also in the inner end of the guide slot 30 wherein the spring 42 will move the latch 36 to a latched position, as illustrated in Figure 2. An L-shaped guide 46 is provided for guiding the horizontal swinging movement of the outer end of the latch 36.

Formed integrally with the coupling plate 34 and positioned therebelow is an enlarged rigid gear 48 having a plurality of peripheral teeth 50 thereon. The gear 48 is separated from the coupling plate 34 by a peripheral groove 52 which extends inwardly a relatively short distance. Secured to and integrally formed with the fifth wheel 24 is a semi-cylindrical peripheral upstanding flange 54 which terminates at its upper edge in an inwardly extending flange 56 which is received within the annular groove 52 between the gear 48 and the coupling plate 34 whereby the gear 48 and the coupling plate 34 will be captively held against the fifth wheel 24 thereby preventing relative vertical movement between the fifth wheel 24 and the coupling plate 34 and also preventing relative forward longitudinal movement between the coupling plate 34 and the fifth wheel 24 wherein the gear 48 will be accurately positioned in relation to the fifth wheel 24 for a purpose described hereinafter.

The upstanding flange 54 is provided with a pair of openings 57 for receiving a pair of rotatable gears 58 and 60 which extend through the opening 57 and are in meshing engagement with the gear 48. The gears 58 and 60 are each mounted on a vertical rotatable shaft 62 mounted in bearing blocks 64 secured to the outer surface of the fifth wheel 24. Secured to the lower end of the rotatable shaft 62 which mounts the rotatable gear 58 or 60 thereon is mounted a brake drum 66 substantially in the form of a cylindrical member having a central hub 68 secured to the shaft 62 at the lower end thereof. A casing or housing generally designated by the numeral 70 is secured to the undersurface of the fifth wheel 24 and includes a pair of brake shoes 72 mounted thereon having brake shoe lining 74 on the outer surface thereof together with a link 76 interconnecting adjacent ends of the brake shoes 72 at one end thereof and a hydraulic expansion piston and cylinder arrangement 78 interconnecting the other ends for expanding the brake shoes for contacting the brake lining 74 with the brake drum 66 for controlling rotation of the rotatable gears 68 and 60. The hydraulic piston and cylinder arrangement 78 is connected to fluid conduits 80 or 82 for expansion and contraction thereof in a manner described hereinafter.

The fluid conduit 82 is connected to a brake cylinder 84 having the manual control lever 86 together with suitable linkage 88 for operating the master cylinder 84 whereby the hydraulic piston and cylinder arrangement 78 may be actuated manually from a position within the cab of the tractor 14. The conduit 80 is connected to another conduit 90 that is interconnected with the main brake line 92 of the tractor and trailer brake system, which, of course, has a master cylinder 94, control linkage 96 that is actuated by the brake pedal 98 whereby actuation of the brake pedal 98 will actuate the hydraulic piston and cylinder arrangement 78 or actuation of the manual lever 86 will also cause actuation of the hydraulic piston and cylinder arrangement 78. It will be understood that each of the gears 58 and 60 are provided with the same braking and control arrangement whereby they act in unison, and since the gears 58 and 60 are in constant meshing engagement with the enlarged gear 48 on the coupling plate 34 connected to the trailer 12, it will be seen that by controlling the expansion and contraction of the hydraulic mechanism 78, the rotation of the gear 58 and 60 may be retarded or completely stopped, thereby restraining or stopping relative pivotal movement between the fifth wheel member 24 and the coupling plate 34 whereby relative pivotal movement between the trailer 12 and tractor 14 is eliminated or controlled, depending upon the force exerted on the control lever 86 or the brake pedal 98. By manipulation of the manual control lever 86, the pivotal movement between the tractor 14 and the trailer 12 may be controlled during backing or parking of the trailer, as desired. Also, the hand control lever 86 will form an auxiliary to the brake pedal 98 wherein the pivotal motion between the tractor 14 and the trailer 12 may be completely eliminated while the foot pedal brake 98 may be alternately applied and released, such as when stopping on ice or the like, thereby facilitating the handling of the tractor and trailer and eliminating the tendency of the tractor and trailer to jackknife in this particular condition. The upstanding flange as well as the inturned flange 56 forms a guide for aligning the coupling plate 34 and the fifth wheel 24 when the tractor 14 is coupled to the trailer 12 and also facilitates the uncoupling operation thereof such as when conducting a humping action.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. In combination with a tractor and trailer, a swivel having a part thereof including a coupling plate mounted on said trailer and the remaining part including a fifth wheel on said tractor, thereby pivotally interconnecting said trailer and tractor, and releasable means rigidly locking said swivel for limiting pivotal movement between the tractor and trailer, said means comprising an enlarged gear rigid with the coupling plate mounted on the trailer, at least one rotatable gear in meshing engagement therewith and mounted on the part of said swivel positioned on the tractor, and brake means for controlling the rotation of said rotatable gear thereby controlling the pivotal movement between the tractor and trailer, the part of the swivel mounted on the trailer having an annular groove between the enlarged gear and the coupling plate, and a partial peripheral upstanding flange on the front of the fifth wheel mounted on the tractor, said flange terminating in an inwardly extending horizontal flange received in said groove thereby preventing forward longitudinal or vertical movement of said enlarged gear and trailer in relation to the rotatable gear and tractor.

2. In combination with a tractor and trailer, a swivel having a part thereof including a coupling plate mounted on said trailer and the remaining part including a fifth wheel on said tractor, thereby pivotally interconnecting said trailer and tractor, and releasable means rigidly locking said swivel for limiting pivotal movement between the tractor and trailer, said means comprising an enlarged gear rigid with the coupling plate mounted on the trailer, at least one rotatable gear in meshing engagement therewith and mounted on the part of said swivel positioned on the tractor, and brake means for controlling the rotation of said rotatable gear thereby controlling the pivotal movement between the tractor and trailer, the part of the swivel mounted on the trailer having an annular groove between the enlarged gear and the coupling plate, and a partial peripheral upstanding flange on the front of the fifth wheel mounted on the tractor, said flange terminating in an inwardly extending horixontal flange received in said groove thereby preventing forward longitudinal or vertical movement of said enlarged gear and trailer in relation to the rotatable gear and tractor, said brake means including said rotatable gear mounted on a shaft with a brake drum thereon, and a pair of outwardly expanding brake shoes rigidly connected to the part of the swivel on the tractor for engaging said drum thereby controlling the rotation of said rotatable gear and relative pivotal movement between the tractor and trailer.

3. In combination with a tractor and trailer, a swivel having a part thereof including a coupling plate mounted on said trailer and the remaining part including a fifth wheel on said tractor, thereby pivotally interconnecting said trailer and tractor, and releasable means rigidly locking said swivel for limiting pivotal movement between the tractor and trailer, said means comprising an enlarged gear rigid with the coupling plate mounted on the trailer, at least one rotatable gear in meshing engagement therewith, a shaft rotatably mounting the rotatable gear on the part of said swivel positioned on the tractor, and brake means for controlling the rotation of said rotatable gear thereby controlling the pivotal movement between the tractor and trailer, the part of the swivel mounted on the trailer having an annular groove between the enlarged gear and the coupling plate, and an upstanding partial peripheral flange on the front of the fifth wheel mounted on the tractor, said flange terminating in an inwardly extending horizontal arcuate flange received in said groove thereby preventing forward longitudinal or vertical movement of said enlarged gear and trailer in relation to the rotatable gear and tractor, said brake means including said shaft having a brake drum on the lower end thereof, and a pair of outwardly expanding brake shoes pivotally supported from the part of the swivel on the tractor for engaging said drum thereby controlling the rotation of said rotatable gear and relative pivotal movement between the tractor and trailer, said brake shoes being actuated by fluid pressure and interconnected with an independent manual control lever in the cabe of the tractor and the braking system of the tractor and trailer for selectively controlling the pivotal movement between the tractor and trailer in response to actuation of the braking system of the vehicle or in response to the independent manual control lever.

References Cited in the file of this patent

UNITED STATES PATENTS

| | | |
|---|---|---|
| 2,564,592 | Bishop | Aug. 14, 1951 |
| 2,673,747 | Norris | Mar. 30, 1954 |
| 2,709,088 | Orbits | May 24, 1955 |